United States Patent
Kobayashi et al.

(10) Patent No.: US 6,317,769 B1
(45) Date of Patent: Nov. 13, 2001

(54) APPARATUS FOR CALCULATING OF $B^C$ (MOD N) WITH REPEATEDLY SHIFTING A HOLDING VALUE

(75) Inventors: Yoshinao Kobayashi; Akashi Satoh, both of Kanagawa-ken; Hideto Nijima, Tokyo, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,942

(22) Filed: Dec. 23, 1998

Related U.S. Application Data

(63) Continuation-in-part of application No. 08/928,538, filed on Sep. 12, 1997, now Pat. No. 5,928,315.

(30) Foreign Application Priority Data

Sep. 18, 1996 (JP) .................................................. 8-246250
Sep. 10, 1997 (JP) .................................................. 9-245113

(51) Int. Cl.$^7$ ...................................................... G06F 7/72
(52) U.S. Cl. ............................................ 708/491; 708/606
(58) Field of Search .................................. 708/491, 606; 380/28

(56) References Cited

U.S. PATENT DOCUMENTS

| | | | |
|---|---|---|---|
| 4,532,638 | * | 7/1985 | Lagger et al. ......................... 708/491 |
| 5,289,397 | * | 2/1994 | Clark et al. ........................... 708/491 |
| 5,479,365 | * | 12/1995 | Ogura .................................... 708/491 |
| 5,513,133 | * | 4/1996 | Cressel et al. ........................ 708/491 |
| 5,793,660 | * | 8/1998 | Rentschler ............................. 708/491 |
| 6,038,318 | * | 3/2000 | Roden ..................................... 708/606 |
| 6,085,210 | * | 7/2000 | Buer ....................................... 708/491 |
| 6,185,596 | * | 2/2001 | Hadad et al. .......................... 708/491 |

\* cited by examiner

*Primary Examiner*—David H. Malzahn
(74) *Attorney, Agent, or Firm*—Scully, Scott, Murphy & Presser; Louis P. Herzberg

(57) ABSTRACT

An apparatus to calculate a remainder of $B^c$ modulo n at high speed with minimum hardware resources, while securing safety of a key comprises: a first circuit to execute a process of calculating B (mod n) and holding the calculation result B1 and to repeat a process of shifting a holding value and calculating a value congruent to the shifted holding value modulo n and holding the calculation result; a first register for storing the B1 as an initial value; a second circuit to cumulate the calculation result of the first circuit when a value of a bit at a predetermined position of the first register is equal to 1; a second register to store 1 as an initial value; a C output circuit to output C; a third circuit to cumulate the calculation result of the first circuit when an output value from said C output circuit is equal to 1 and a value of a bit at a predetermined position of the second register is equal to 1. The bit at the predetermined position of the first register and the second register shifts from LSB to MSB of their stored values. When a process for MSB of a value stored by the first register ends, a value congruent to the cumulated result in the second circuit modulo n is set as the holding value and stored into the first register, the output of the C output circuit changes to a value shifted from LSB to MSB of the C, and when the output of the C output circuit is 1, a value congruent to the cumulated result in the third circuit modulo n is stored in the second register.

17 Claims, 4 Drawing Sheets

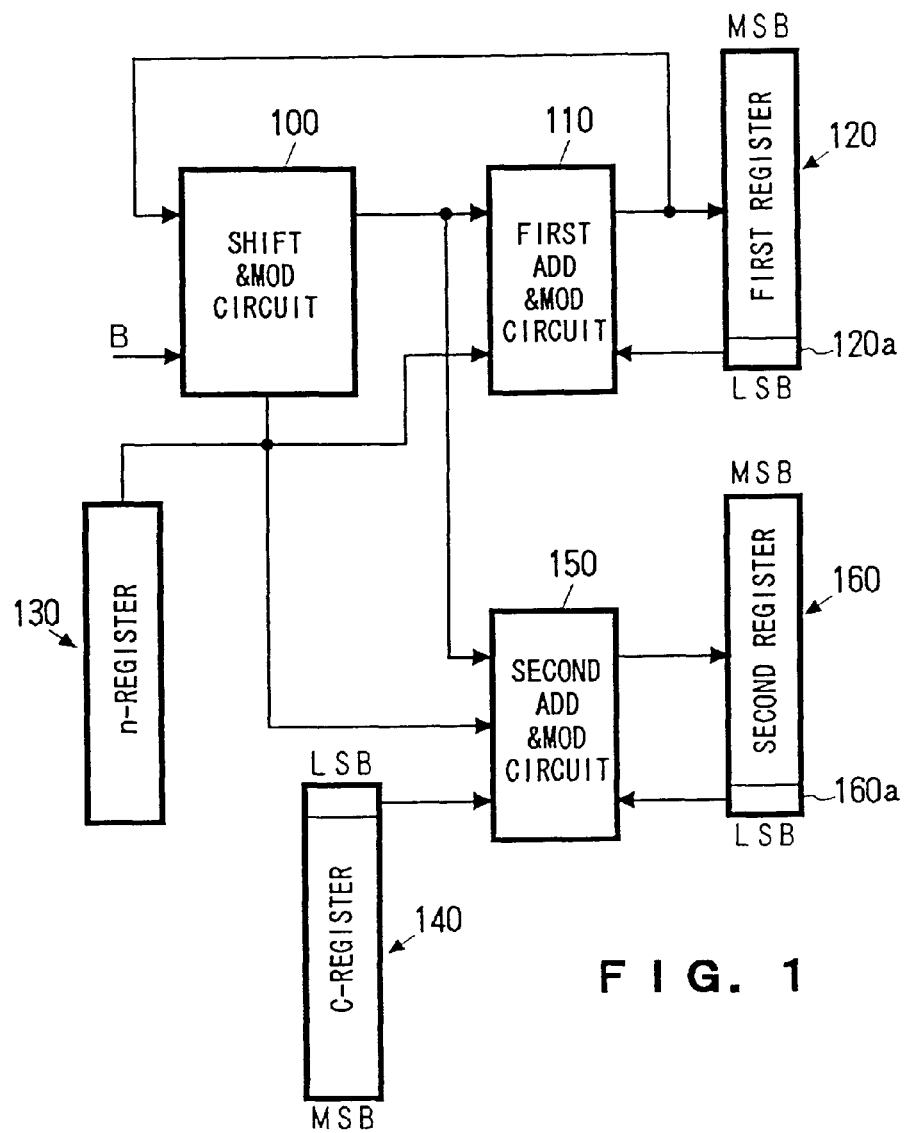
F I G. 1
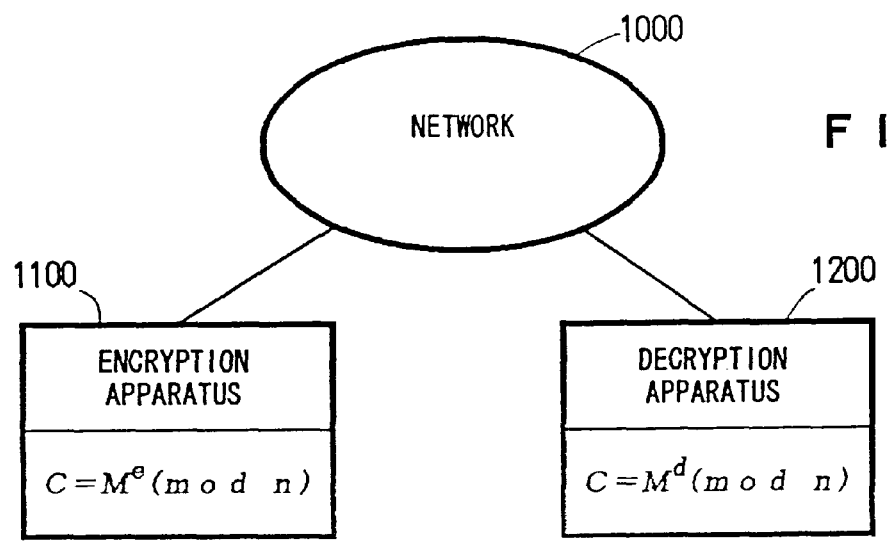
F I G. 7

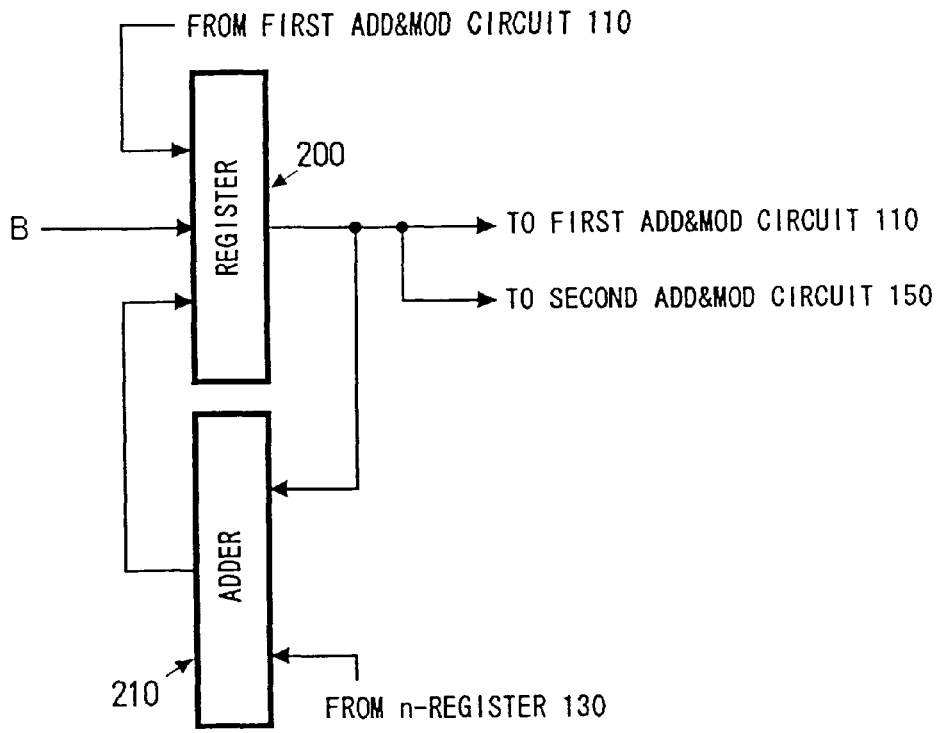
F I G. 2
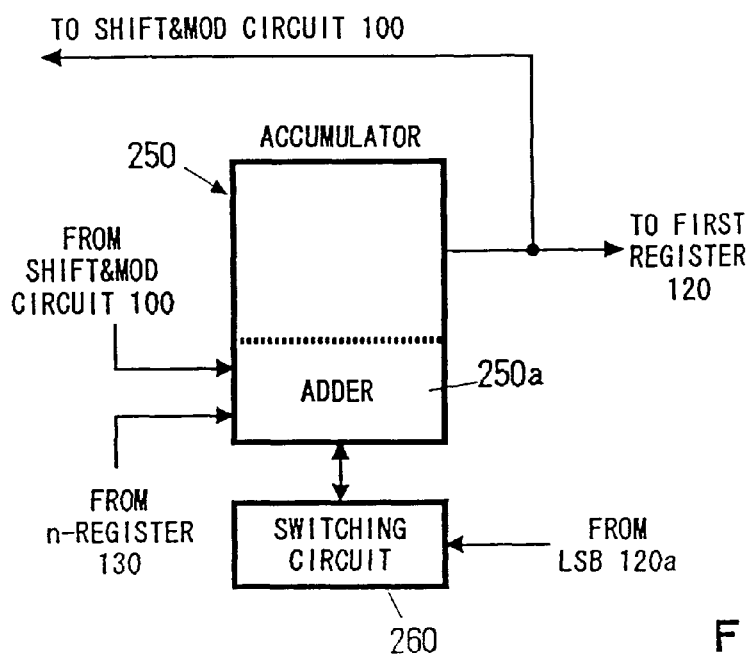
F I G. 3

APPARATUS FOR CALCULATING OF B$^C$ (MOD N) WITH REPEATEDLY SHIFTING A HOLDING VALUE

CONTINUATION-IN-PART APPLICATIONS

The following patent application is a Continuation-in-Part application based on and claims the benefit of U.S. patent application Ser. No. 08/928,538, filed Sep. 12, 1997, now U.S Pat. No. 5,928,315.

BACKGROUND OF THE INVENTION

1. Technical Field

The present invention relates to an apparatus for processing a Rivest, Shamir, and Adelman (RSA) cryptographic system at high speeds, and more particularly to an apparatus for calculating Bc (mod n) which is needed in the RSA cryptographic system.

2. Prior Art

In order to process the RSA cryptographic system, the following equation (1) needs to be calculated for three numerical values, n, B, and C of longer than 512 bits.

$$B^c(\mathrm{mod}\ n) \qquad (1)$$

The value of Eq. (1) becomes 1, when n is a prime greater than B and C is equal to (n−1). Also, when C=n, the value of Eq. (1) becomes B. That is, the value becomes as follows:

$$B^{n-1} \equiv 1 (\mathrm{mod}\ n)$$

$$B^n \equiv B(\mathrm{mod}\ n).$$

These are known as a Fermat's principle.

In the case where n is the product of two primes p and q, the value of Eq. (1) becomes 1, when B is relatively prime with (p−1) and (q−1) and C is a multiple of (p−I)·(q−1). Also, when the value of Eq. (1) is divided by (p−1)·(q−1) and the reminder is 1, the value becomes equal to the original value B. That is, n can be solved into two factors, such as n=p·q, and if (B, k)=1 (note: the greatest common divider is 1) and k=(p−1)·(q−1), the following equations are established for the k.

$$B^k \equiv 1 (\mathrm{mod}\ n)$$

$$B^{k+1} \equiv B(\mathrm{mod}\ n).$$

This is referred to as an Euler's theorem. The Fermat's principle forms part of the Euler's theorem.

Now, if the following e and d exist, e can be employed as an encryption key and d as an decryption key.

$$e \cdot d \equiv 1 (\mathrm{mod}\ k)$$

That is, a value encrypted in e can be decrypted by d. Also, since conversely a value encrypted in d can be decrypted by e, communication can be performed between specific two, while opponents are being confirmed with each other.

For example, when B is encrypted and sent, $$B^e \equiv M(\mathrm{mod}\ n)$$

is calculated and M is sent. Then, at the receiving side, $$M^d \equiv B^{ed} \equiv B(\mathrm{mod}\ n)$$

is calculated and B is decrypted. Note that (B, e)=1 and (B, d) 1.

In the case of a process such as authentication to confirm opponents, by using an X which is known to both the transmitting side calculates, $$X^d \equiv N$$

and transmits N. Then, the receiving side calculates N$^e$, and if x can be derived from $$N^e \equiv X^{ed} \equiv X,$$

it can be confirmed that the receiving side is communicating with a right opponent. Note that (B e)=1 and (B, d)=1.

If a single set of e and d such as this is found, e and d will be raised to the power of m, respectively, and em and dm will be employed as a set of new keys. The number of sets of keys (em, dm) is about (p−1)·(q−1), and since this number is sufficiently large, sets of keys (em, dm) can be assigned to communication paths by 1 to 1. Here, if a value of n is determined, a set of the remainders of (em, dm) modulo (p−1)·(q−1)=k can be generated by the same hardware. That is, the following equations can be generated.

$$e^m \equiv em(\mathrm{mod}\ k)$$

$$d^m \equiv dm(\mathrm{mod}\ k)$$

In the RSA cryptographic system, encryption and decryption can be performed by the same hardware, there is reversibility, and it is difficult for a person who does not know a key to solve a cryptograph. For these reasons, the RSA cryptographic system has been extensively used.

An example of an apparatus, which actually makes a calculation by using principles such as this, is disclosed in Japanese Published Examined Patent Application No. 7-86822. Now, preparations for the following description are made. For example, it is understood at once that the remainder of 8×9 modulo 7 is 2 (=8×9−7×10). If this calculation is expressed by a binary expression, the remainder of 8×9 modulo 7 is equivalent to the remainder of 1000×1001 modulo 0111. When this is simply calculated, multiplication is first performed as shown in FIG. 5. If such calculation is performed, a 7-bit register will be needed for multiplication of 4 bits×4 bits. Therefore, when a greater number of bits are calculated by hardware, a load on the hardware becomes larger. Hence, as shown in FIG. 6, in step 1, 1000 (8) is fetched and the remainder of 1000 (8) is calculated modulo 0111 (1001, which is a complement of 2 of 0111, is added), so 0001 is obtained. Then, in step 2, 0001 is shifted (that is, "doubled") and the remainder of 0010 is calculated modulo 0111. In this stage, since 0010 is smaller than 0111, 0010 is obtained as it is. In step 3, 0010 is shifted (that is, "doubled") and the remainder of 0100 is calculated modulo 0111. In this stage, since 0100 is smaller than 0111, 0100 is obtained as it is. In step 4, 0100 is shifted (that is, "doubled") and the remainder of 1000 is calculated modulo 0111. As a result, 0001 is obtained. Next, when the result 0001 of step 1 corresponding to the least significant bit (LSB) where 1 exists in 1001 (9) and the result 0001 of step 4 corresponding to the most significant bit (MSB) where 1 likewise exists in 1001 are added, 0010 (2) can be obtained. The aforementioned calculation can be performed by using a 4bit (or 5-bit if a carry bit is included) register. The result of the shift and MOD calculations corresponding to bit positions at which 1 exists among 1001 (9) has been added. However, even if the remainder of 1001 (9) modulo 7 were first calculated (in this example, 0010 is obtained) and then the result (result of step 2 in this example) of the shift and MOD calculations corresponding to bit positions at which 1 exists among 0010 are added, the same result (0010 in this example) would be obtained.

In view of the foregoing points, the apparatus shown in Japanese Published Examined Patent Application No.

7-86822 will be described with FIG. 8. Since it is assumed that M(mod n)=C is calculated, this description is made according to the assumption. M is input by a numerical value input and is input to a multiplicand register 1. The output of this register 1 is input to a remainder arithmetic unit 3, in which the aforementioned shift and MOD calculations are performed. In order to perform the MOD calculation, n has been input to a divisor register 2 as a divisor input. Note that since subtraction is performed, a complement of 2 of n is input. Then, the result of the remainder arithmetic unit 3 is input to the multiplicand register 1 through a multiplicand selector 11. This processing is iterated by the number of bits of M.

Also, M is set to a multiplier register 10 through an input register 7, a register 8, and a multiplier register 9. The result of the remainder arithmetic unit 3 corresponding to a bit at which 1 exists since the LSB in this M is input to a cumulative remainder arithmetic unit 4 through a remainder selector 12. In this cumulative remainder arithmetic unit 4, the result of the remainder arithmetic unit 3 is added to the result of a cumulative remainder register 5 and the remainder of n is calculated, and the result is stored in the cumulative remainder register 5. This corresponds to the addition processing described last in the example of 8×9 (mod 7). If the foregoing process is performed by the amount of the bits of M, M×M (mod n) will be calculated and the result will be output to the cumulative remainder register S. If it is desired that $M^2$ (mod n) is calculated, the result will be input to the output register 13 and the processing will be ended.

However, calculation is usually performed according to the bits of the exponent e input to an exponent register 6. Therefore, for power arithmetic, the multiplier selector 9 deals in sequence with each of the bit outputs which lead from the most significant bit (MSB) of the exponent register 6 to the least significant bit (LSB). When the logic value is 0, the previous cumulative remainder value S (this is stored in the multiplicand register 1) stored in the cumulative remainder register 5 is set to the multiplier register 10. As a consequence, the processing of S×S (mod n) is executed. Also, when the logic value is 1, the previous cumulative remainder value S is first set to the multiplier register 12 to obtain S×S (mod n). Then, the numerical value M, which is the content of the input register 7, is set to the multiplier register 12 to obtain {S×S (mod n)×M} (mod n).

In an apparatus such as this, the processing speed is increased, however, as previously described, the calculation is made from the MSB of the exponent e and is different between 0 and 1. Therefore, the apparatus is disadvantageous in that if the operation in this processing is analyzed, there will be the possibility that a key will be exposed.

Accordingly, an objective of the present invention is to provide an apparatus which calculates the remainder of Bc modulo n at high speed with a minimum hardware resource, while securing the safety of a key.

Another objective of the present invention is to reduce power consumption.

SUMMARY OF THE INVENTION

To achieve the foregoing objectives the present invention comprises: a first circuit for executing a process of calculating B (mod n) and holding the calculation result B1 and for repeating a process of shifting a holding value and calculating a value congruent to the shifted holding value modulo n and holding the calculation result; a first register for storing the B1 as an initial value; a second circuit for cumulating the calculation result of the first circuit when a value of a bit at a predetermined position of the first register is equal to 1; a second register for storing 1 as an initial value; a C output circuit for outputting C; a third circuit for cumulating the calculation result of the first circuit when an output value from said C output circuit is equal to 1 and a value of a bit at a predetermined position of the second register is equal to 1. The bit at the predetermined position of the first register and the second register shifts from LSB to MSB of their stored values. When a process for MSB of a value stored by the first register ends, (a) a value congruent to the cumulated result in the second circuit modulo n is set as the holding value and stored into the first register, (b) the output of the C output circuit changes to a value shifted from LSB to MSB of the C, and (c) when the output of the C output circuit is 1, a value congruent to the cumulated result in the third circuit modulo n is stored in the second register. If done in this way, $B^2$, $B^4$, $B^8$ . . . are calculated in the second circuit. The third circuit performs the power arithmetic. When all bits of the output from the C output circuit are processed, the second register stores the remainder of a modulo n.

The aforementioned first register, second register, and C output circuit may be shift registers, respectively. The position of a pointer may be moved in a generally used register. Particularly, the C output circuit may be a linear feedback shift register (LFSR).

Also, the aforementioned second circuit can include a circuit for calculating a remainder of the cumulated value modulo n each time the calculation result of the first circuit is cumulated. The same may be said of the third circuit.

In addition, the second circuit may subtract xn (where x is a positive integer) from the cumulated value in the second circuit, when the value of the bit at the predetermined position of the first register is 0 and the cumulated value in the second circuit is a positive value; and may judge whether the cumulated value in the second circuit is a positive value or not, when a process for M of a value stored by the first register ends; and may subtract xn from said cumulated value of the second register until the cumulated value becomes negative, when it is judged that the cumulated value is positive; and may add yn (where y is a positive integer) to the cumulated value in the second circuit until the cumulated value becomes positive, when it is judged that the cumulated value is negative. If done in this way, the number of MOD calculations can be reduced. This can be performed by changing a value which is added in one addition circuit.

Similarly, the third circuit may subtract xn (where x is a positive integer) from the cumulated value of the third circuit, when the output value of the C output circuit is 1 and the value of the bit at the predetermined position of the second register is 0 and the cumulated value in the third circuit is a positive value; and may judge whether the cumulated value of the third circuit is a positive value or not, when the output of the C output circuit is 1, the process for MSB of a value stored by the second register ends; and may subtract xn from the cumulated value in the third circuit until the cumulated value becomes negative, when it is judged that the cumulated value is positive; and may add yn (where y is a positive integer) to the cumulated value in the third circuit until the cumulated value becomes positive, when it is judged that the cumulated value is negative.

The apparatus of the present invention may further comprise an n-register for storing n. During a process of calculating B (mod n) and holding the calculation result B1, the n-register may shift the n in the direction of the most significant bit so that a first bit, which is 1, becomes the most significant bit when the n is checked from the most significant bit and then may shift the shifted value one bit at a time in the direction of the least significant bit until it becomes equal to the B, and may output each shifted value after the change of the shift direction in sequence to the first circuit. Also, the first circuit may make a subtraction if each shifted value obtained from the n-register can be subtracted from the B. If done in this way, there is an advantage that the remainder of B modulo n can be calculated by changing a value which is input to an addition circuit within the same hardware.

Furthermore, there are a lot of variations for the first circuit. For example, the first circuit may shift the holding value and may subtract pn (where p is a positive integer) from the shifted holding value when the holding value in the first circuit is positive; and may shift the holding value and may add qn (where q is a positive integer) to the shifted holding value when the holding value in the first circuit is negative. Allowing the holding value in the first circuit to be not only the positive value but also the negative value achieves an advantage of the simple configuration of the second and third circuits.

In addition, the first circuit may shift the holding value by r bits (where r is a positive integer) and may calculate a value congruent to the shifted holding value modulo n when the value at the predetermined position of the first and second registers and the output of the C output circuit are values such that the second and third circuits do not perform the cumulation. Since there are some periods for which the second and third circuits do not operate according to the values of the first and second registers and the output of the C output circuit and the first circuit can skip the non-operating periods, the first circuit changes the number of the shifted bits of the holding value and correspondingly changes the subtracted value (or added value) and then speeds up the processing of the whole circuit.

In addition, the r may be 2, and the first circuit may multiply the holding value by 4 and may subtract one value selected from a group of n and 2n and 3n based on the holding value and n from the multiplied holding value when the holding value is positive; and may multiply the holding value by 4 and may add n or 2n or 3n based on the holding value and n to the multiplied holding value when the holding value is negative. During the unnecessary period, the processing is speeded up by 2-bit shifting. However, 3n must be generated.

Furthermore, the r may be 1, and the first circuit may double the holding value and may subtract n from the doubled holding value when the holding value is positive and, based on the doubled and subtracted holding value, may determine whether the doubled and subtracted holding value is further doubled; and may double the holding value and may add n to the doubled holding value when the holding value is negative and, based on the doubled and added holding value, may determined whether the doubled and added holding value is further doubled. By this way, there is no need to generate 3n but the advantage of the processing speed is declined.

In addition to the described variations, a lot of varieties are derived from the embodiment of the present invention described below.

BRIEF DESCRIPTION OF THE DRAWINGS

Preferred embodiments of the present invention will now be described, by way of example only, with reference to the accompanying drawings, in which:

FIG. 1 is a block diagram of the present invention;

FIG. 2 is a block diagram showing the details of a shift & mod circuit 100;

FIG. 3 is a block diagram showing the details of a first add & mod circuit 110;

FIG. 7 is a block diagram showing a cryptographic system.

DETAILED DESCRIPTION OF THE PREFERRED EMBODIMENTS OF THE INVENTION

Figures 4, 5, 6:
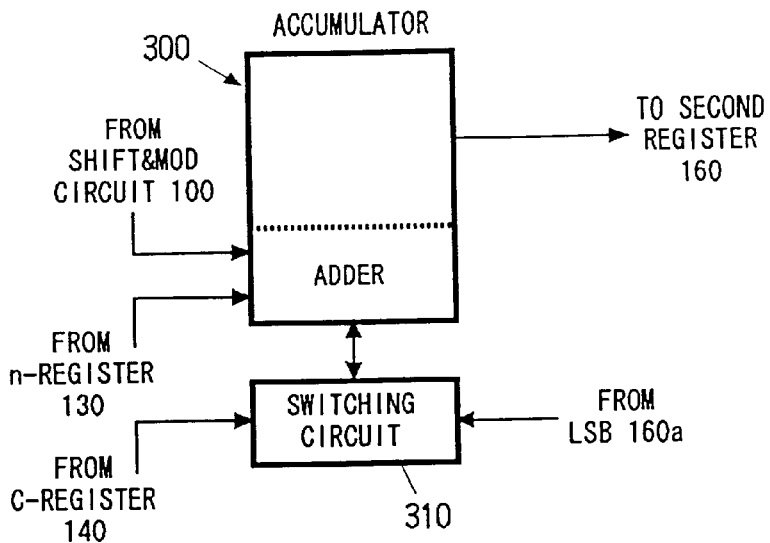
FIG. 4 is a block diagram showing the details of a second add & mod circuit 150.
FIG. 5 is a diagram used to explain multiplication expressed in binary.
FIG. 6 is a diagram used to explain multiplication expressed in binary.
Figure 8:
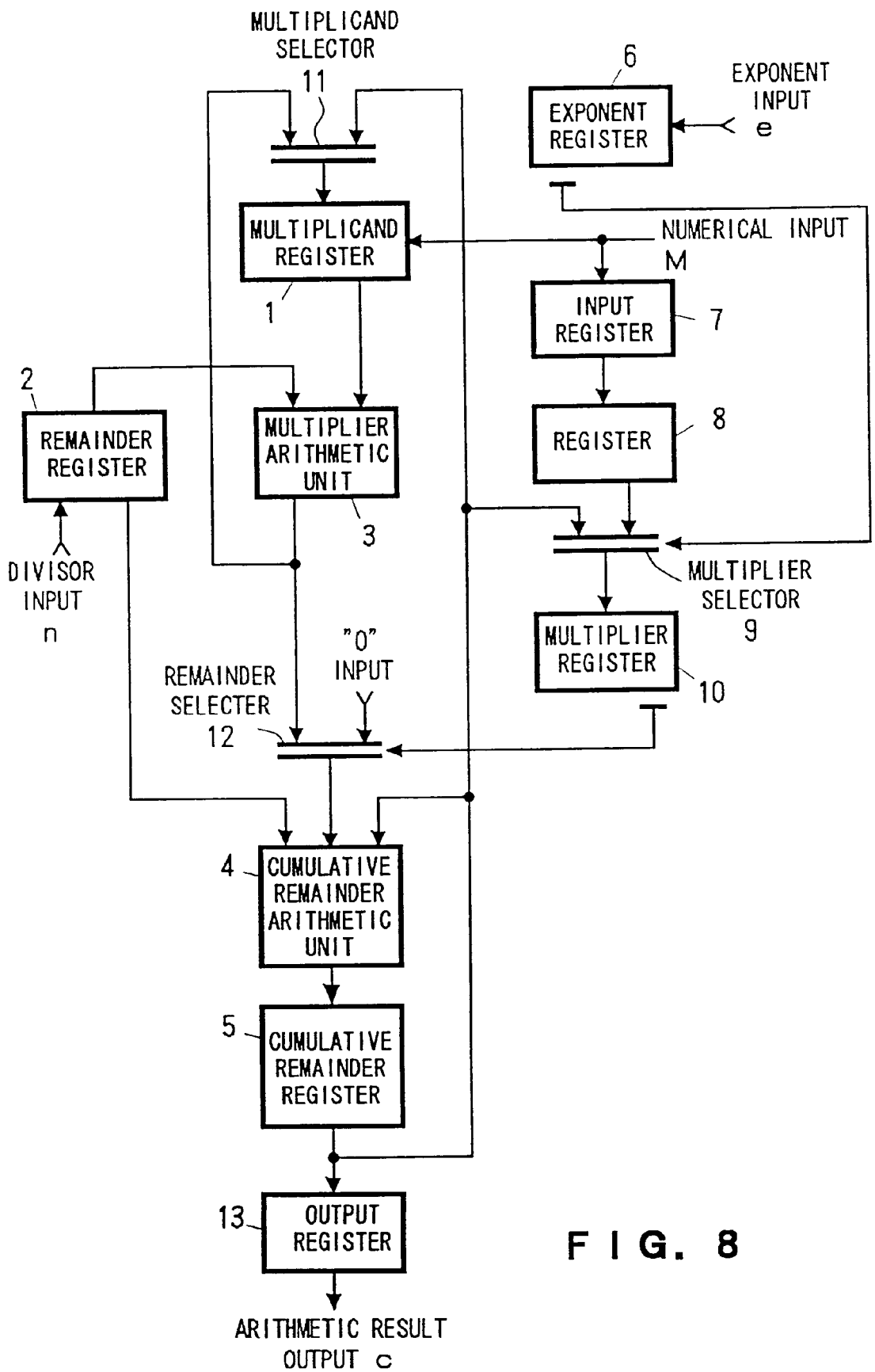
FIG. 8 is a diagram used to explain background art.

First, the basic policy of the calculation of the present invention will be described. Assume that the C in $B^c$ (mod n) is expressed in binary numbers and that each bit is written as $(c(m-1), \ldots, c4, c3, c2, c1, c0)$. That is, numbering is performed in sequence since 0 in order from the LSB of C to the MSB. If done in this way, a (mod n) can be solved as follows:

$$B^C (\bmod n) = (B^{(\ldots,0,0,0,c0)} (\bmod n) \times B^{(\ldots,0,0,c1,0)} (\bmod n) \times$$
$$B^{(\ldots,0,c2,0,0)} (\bmod n) \times B^{(\ldots,0,c3,0,0,0)} (\bmod n) \times$$
$$B^{(\ldots,0,c4,0,0,0,0)} (\bmod n) \times \ldots) (\bmod n)$$

Therefore, $B^{(\ldots,0,0,0,1)}$ (mod n), $B^{(\ldots,0,0,1,0)}$ (mod n), $B^{(\ldots,0,1,0,0)}$ (mod n), $B^{(\ldots,0,1,0,0,0)}$ (mod n), $B^{(\ldots,0,1,0,0,0,0)}$ (mod n), ... are first generated in sequence. This is referred to as square calculation. The calculation result of the aforementioned power of B only at bits corresponding to x where cx=1 (x is an integer between 0 and the number of bits of C) is multiplied. This is referred to as power calculation.

For example, when $B^{(1101001)}$ (mod n) is calculated, $B^{(0000001)}$ (mod n), $B^{(0000010)}$ (mod n), $B^{(0000100)}$ (mod n), $B^{(0001000)}$ (mod n), $B^{(0010000)}$ (mod n), $B^{(0100000)}$ (mod n), and $B^{(1000000)}$ (mod n) are generated in order. Then, when $B^{(0000001)}$ (mod n) and $B^{(0001000)}$ (mod n) are generated, they are multiplied, and the remainder of the result of the multiplication modulo n is calculated. This result is taken to be S1. Next, when $B^{(0100000)}$ (mod n) is generated, it is multiplied by S1, and the remainder of the result of the multiplication modulo n is calculated. This result is taken to be S2. Furthermore, when $B^{(1000000)}$ (mod n) is generated, it is multiplied by S2, and the remainder of the result of the multiplication modulo n is calculated. If done in this way, $B^{(1101001)}$ (mod n) can be calculated.

Each square calculation and power calculation is executed by the shift and MOD calculations described in the column of background art and addition and MOD calculations. That is, a multiplicand is shifted (that is, "doubled") m times (where m is the number of bits of the multiplicand) (exactly speaking, m−1 times, as described in the column of background art), and the remainder of the result modulo n is calculated. Then, the results of the shift and MOD calculations, which correspond to the order when a bit which is 1 among the bits of a multiplier is counted since the LSB, are added in sequence, and the remainder of the result modulo n is calculated.

The constitution of the present invention will be described in reference to FIG. 1. A shift & mod circuit 100 is connected to a first add & mod circuit 110. B to be cryptographer or the output from the first add & mod circuit 110 is input to the shift & modulo circuit 100. The shift & mod circuit 100 is also connected to an n-register 130 for obtaining n which is used for MOD calculation. The first add & mod circuit 110 is connected to a first register 120 (which is a shift register) so that the LSB 120a of the first register 120 is input. For performing the MOD calculation, the first add & mod circuit 110 is connected to the n-register 130.

The shift & mod circuit 100 is also connected to a second add & mod circuit 150 so that the LSB from a C register 140, which is a shift register, is received. The second add & mod circuit 150 is also connected to the n-register 130 for performing MOD calculation. The output of the second add & mod circuit 150 is input to a second register 160 which is a shift register, and conversely, the LSB 160a of the second register 160 is output to the second add & mod circuit 150. The initial value of the second register 160 is 1.

Next, the operation of the circuit shown in FIG. 1 will be described. Initially, when B to be cryptographer is input to the shift & mod circuit 100, the circuit 100 will receive n from the n-register 130 and calculate the remainder of the B modulo n. This result is taken to be B11. Note here that, in the first step, the shift operation is not performed. The B11 is output to the first register 120 through the first add & mod circuit 110.

The B11 is input to the first register 120 through the first add & mod circuit 110. At this time, the first add & mod circuit 110 receives and holds the LSB of the B11. Then, the bits, excluding the LSB from the B11, are input to the first register 120. If done in this way, the number of bits of the first register 120 can be reduced. However, the B11, as it is, may be input to the first register 120. Also, B itself may be input to the first register 120, as briefly described in the column of background art.

As previously described, the first calculation result B11 of the shift & mod circuit 100 is held in the shift & mod circuit 100 and is output to the first add & mod circuit 110. The first add & mod circuit 110 first receives the LSB of the B11 from the shift & mod circuit 100 or the first register 120. If the LSB is 1, the calculation result B11 of the shift & mod circuit 100 will be loaded into the first add & mod circuit 110. That is, the calculation result B11 is simply held. Generally, addition is performed and a remainder modulo n is calculated, however, when the LSB (in some cases, the output from the LSB 120a) first attains 1, only the loading operation is performed, because addition is performed with respect to zero and also the remainder modulo n has been calculated in the shift & mod circuit 100. Note that the solution would remain unchanged even if the addition and the calculation of the remainder modulo n were performed. Also, if the LSB of B11 is 0, the input from the shift & mod circuit 100 will be ignored. For the calculation of the remainder modulo n, as with the shift & mod circuit 100, the output from the n-register 130 is employed. Next, the shift & mod circuit 100 shifts (that is—"doubles") the aforementioned calculation result B11 and calculates the remainder of the result modulo n. This calculation result is taken to be B12. The B12 is held in the shift & mod circuit 100 and is output to the add & mod circuit 110. The first add & mod circuit 110 refers to the value of the LSB 120a of the first register 120. When the B11 excluding the LSB is input, the first register 120 outputs the bit existing at the LSB 120a. When the B11 itself is input, the first register 120 shifts the B11 one bit and outputs the value of the bit put into the LSB 120a by the shifting. The shifting direction is a direction from the MSB to the LSB. If the value of the LSB 120a of the first register 120 is 1, the B12 will be added to the value held in the first add & mod circuit 110. That is, if the LSB of the B11 is 1, the addition of the calculation results B11 and B12 will be performed, and if the LSB of the B11 is 0, 0 and B12 will be added. As previously described, when the output of the LSB 120a first attains 1, only the loading operation may be performed. Then, the remainder of the addition result modulo n is calculated and the calculated value is held. Also, when the value of the LSB 120a is 0, no operation is performed.

Then, the shift & mod circuit 100 shifts (that is, "doubles") the aforementioned calculation result B12 and calculates the remainder of the result modulo n. This calculation result is taken to be B13. The B13 is held in the shift & mod circuit 100 and is output to the first add & mod circuit 110. The first add & mod circuit 110 refers to the value of the LSB 120a of the first register 120. The first register 120 shifts its content one bit from the aforementioned processing and outputs the value of the bit put into the LSB 120a by the shifting. If the value of the LSB 120a is 1, the B13 will be added to the value held in the first add & mod circuit 110, and the remainder modulo n will be calculated. If the value of the LSB 120a is 0, no operation will be performed.

The foregoing process is repeated until B1m (where m is the number of bits of B) is processed by the first add & mod circuit 110. If B1m is processed by the first add & mod circuit 110, $B^2$ (mod n) will be generated. B (mod n) is output to the shift & mod circuit 100 and also is output to the first register 120. This is for calculating $B^4$ (mod n). As previously described, when it is desired that the number of bits of the first register 120 is reduced, the LSB of $B^2$ (mod n) is held in the first add & mod circuit 110, and the bits, excluding the LSB from $B^2$ (mod n), is output to the first register 120. Also, $B^2$ (mod n), as it is, may be output to the first register 120 and may be held in the register 120.

The shift & mod circuit 100, which received the $B^2$ (mod n), holds the value. This is because the remainder modulo n has already been calculated. Then, the first add & mod circuit 100 refers to the value of the LSB 120a of the first register 120 or the value of the LSB of the held $B^2$ (mod n). In the case of 1, $B^2$ (mod n) is held. In the case of 0, $B^2$ (mod n) is cleared and 0 is held. This step only performs the addition with 0 and the remainder modulo n has already been calculated, and consequently, this step only determines whether $B^2$ (mod n) is held or not. $B^2$ (mod n) is taken to be B21.

Next, the shift & mod circuit 100 shifts (that is, "doubles") the held B21 by one bit and calculates the remainder modulo n. This calculation result B22 is output to the first add & mod circuit 110. When the value of the LSB 120a of the first register 120 (or the value after the execution of the 1-bit shifting operation in the case where $B^2$ (mod n), as it is, is held) is 1, the first add & mod circuit 110 adds this value to the value held in the circuit 110 and calculates the remainder modulo n. Then, the result is held. In the case of 0, the output of the shift & mod circuit 100 is ignored without performing any operation.

Hereinafter, the processing is repeated until $B^4$ (mod n) is generated, that is, until B2m is generated and processed (even when ignored, an ignoring process will be performed). In this way, $B^8$ (mod n), $B^{16}$ (mod n), . . . are generated in sequence.

Now, the cooperation of the shift & mod circuit 100 and the second add & mod circuit 150 will be described. As an initial value, I has been input to the second register 160. The second add & mod circuit 150 receives the exponent C of $B^c$ (mod n), stored in the C register 140, from the LSB as an input and switches the operation. Likewise, the second register 160 outputs a bit since the LSB, and the second add & mod circuit 150 switches the operation in accordance with the value of the bit. The aforementioned two registers are shift registers and cause a bit to shift from the MSB to the LSB.

First, the second add & mod circuit 150 receives the LSB of C from the C register 140, and judges whether it receives m outputs of the shift & mod circuit 100 thereafter and the processing is performed. More specifically, if the LSB of C is 1, the m outputs thereafter will be received and the processing will be performed. In the case of 0, the m outputs thereafter will not be received. Then, when the LSB of C is 1, the output of the LSB 160a of the second register 160 is next referred to. If the output of the LSB 160a of the second register 160 is 1, the second add & mod circuit 150 will add the output from the shift & mod circuit 100 and the held value of the circuit 150 (0 for an initial value) and will calculate the remainder modulo n. Then, the calculation result is held. If the output of the LSB 160a of the second register 160 is 0, no operation will be performed. This is repeated by the amount of the number of bits of the second register (which is the same as the number of bits of B). When repeating, the second register 160 is shifted one bit, each time the repeating is performed. However, when the output of the LSB of the C register 140 first attains 1, 1 has been held only in the LSB of the second register 160, and consequently, the first output of the shift & mod circuit 100 is simply loaded without performing addition and calculation of the remainder modulo n. A process such as this is performed in order that the second register 160 holds an exponent value when the bit of C first attains 1 since the LSB. For example, in the case where $B^{(1101001)}$ (mod n) is calculated, the aforementioned process is performed in order to input $B^{(0000001)}$ (mod n) to the second register 160.

If the output of the shift & mod circuit 100 is Processed m times by the second add & mod circuit 150, the C register 140 will shift the stored bit to the side of the LSB by one bit. The same may be said of the case where the circuit 150 does not receive the output of the shift & mod circuit 100. Then, the second add & mod circuit 150 outputs the calculation result to the second register 160 and then clears the value held in the circuit 150. Thereafter, the second add & mod circuit 150 refers to the LSB of the C register 40 and judges whether the bit is I or 0. If the bit is 1, the m outputs of the shift & mod circuit 100 thereafter will be received and addition and calculation of the remainder modulo n will be performed. On the other hand, if the bit is 0, the m outputs of the shift & mod circuit 100 thereafter will be ignored without being received.

If the output of the C register 140 is 1, next the second add & mod circuit 150 will refer to the LSB 160a of the second register 160. If the value is 1, the second add & mod circuit 150 will perform addition and calculate the remainder modulo n. Then, the result is held. However, as previously described, if it is first processing, since it is the addition with 0 and the remainder modulo n has been calculated by the shift & mod circuit 100, the value may be simply held without performing any operation. If the LSB 160a of the second register 160 is 0, the second add & mod circuit 150 will not perform any operation. This is repeated by the amount of the bits of the second register 160. At this time, the second register 150 shifts one bit to the side of the LSB for each input from the shift & mod circuit 100.

When $B^{(1101001)}$ (mod n) is calculated, $B^{(0000001)}$ (mod n) is stored in the second register 160. Then, after the 2m outputs of the shift & mod circuit 100 have been ignored without being received, the next m outputs of the shift & mod circuit 100 are received. By referring to the LSB 160a of the second register 160 in which $B^{(0000001)}$ (mod n) was stored (since the shift operation is performed for each process, the same bit is not always referred to), it is repeated whether the calculation of addition and the remainder modulo n is performed or no operation is performed. Then, after the m-th output from the shift & mod circuit 100 is received and the calculation of addition and the remainder modulo n is performed or no operation is performed, the value held in the second add & mod circuit 150 is input to the second register 160. Then, the value, held in the second add & mod circuit 150, is cleared.

Hereinafter, the value of the LSB of the C register 140 is likewise referred to after the shift operation, and according to the value of the LSB 160a of the second register 160, it is repeated whether the calculation of addition and the remainder modulo n is performed or no operation is performed. Then, when the second add & mod circuit 150 receives the output of the shift & mod circuit 100 m times and performs processing, the value held in the circuit 150 is input to the second register 160. The held value is cleared. For example, when $B^{(1101001)}$ (mod n) is calculated, the m outputs of the shift & mod circuit 100 are not received after the part previously described. The next m outputs are received, and the processing is performed according to the value of the LSB 160a of the second register 160. The result is again stored in the second register 160. Then, the next m outputs of the shift & mod circuit 100 are also received, and the processing is performed according to the value of the LSB 160a of the second register 160.

The result is input to the second register 160. At this stage, the processing for this calculation is ended. The final result has been stored in the second register 160. That is, if the aforementioned operation is repeated until the value stored in the C register 140 disappears by the shift operation, the final result can be obtained within the second register 160.

Now, the details of the shift & mod circuit 100 are shown in FIG. 2. An initial input B is input to a register 200, which is connected to the first add & mod circuit 110 and an adder 210. This adder 210 is connected to the input of the n-register 130, and the output of the adder 210 is fed back to the register 200. Also, as previously described, after the first add & mod circuit 110 has executed a process (including a process of ignoring the output of the shift & mod circuit 100) m times, the output of the first add & mod circuit 110 is input to the register 200.

The operation of the shift & mod circuit 100 will next be described. If the initial input B is input, it is temporarily held by the register 200. The initial input B is also output to the adder 210 without performing the shift operation. Only when this initial input B is processed, the n-register 130 inspects the MSB of the bits held therein, and if the value is 0, it will be shifted one bit from the LSB to the MSB. After this shift operation, the MSB is again inspected. If the value is 0, it will be shifted one bit to the MSB.

Thus, 0's are removed between the position of the MSB of n and the bit before the bit position at which 1 first appears. This value is taken to be n1. Then, the n-register 130 outputs the n1 to the adder 210. The adder 210 is a circuit for calculating the remainder modulo n. In order to calculate the remainder modulo n, a complement of 2 of n is added. Therefore, if n1 is received from the n-register 130, the adder 210 will invert each bit of n1 (NOT processing) and add the inverted result with 1 and B. As a result of this addition, if a carry occurs, the addition will succeed. That is, subtraction succeeds, and the subtraction result b1 is input to the register 200. If a carry does not occur, the subtraction will fail. That is, since n1>B, the B, as it is, is held in the register 200.

Next, the n register 130 shifts n1 to the LSB side by one bit, and the result is output to the adder 210. This value is taken to n2. The adder 210 receives the value held by the register 200 and adds the received value (b1 or B) with a value that each bit of n2 is inverted and 1. As a result of this addition, if a carry occurs, the subtraction will be successful, and the subtraction result b2 will be stored in the register 200. If the subtraction is unsuccessful, the value stored in the register 200 will be held.

The aforementioned processing is repeated until nx (where x is a positive integer)=n and also this n is processed by the adder 210. If done in this way, B (mod n) can be executed with reduced hardware.

An example of the aforementioned processing will be described. When B=10001 and n=00111, the remainder modulo n is 00011. First, if n is shifted to the MSB side, n1 will be equal to 11100. The inverted value of each bit of 11100 is 00011. Therefore, if 00011, 00001 (=1), and 10001 are added, a carry will not be generated and therefore the register 200 will hold B=10001. Next, n1=11100 is shifted one bit to the LSB side, and n2=01110 is obtained. The inverted value of each bit of 01110 is 10001. Therefore, if 10001, 00001, and 10001 from the register 200 are added, a carry will be generated and 00011 can be obtained. Therefore, this value is stored in the register 200. Next, n2=01110 is shifted one bit to the LSB side, and n3=00111 is obtained. This n3 is identical with n. Therefore, if the processing of this n3 is ended, the remainder of B modulo n will be calculated. The inverted value of each bit of 00111 is 11000. If 00001 is added to the 00011 stored in the register 200, a carry will not be generated. Therefore, the value stored in the register 200 is held. At this stage, since the processing ends, 00011 is the remainder of B modulo n and is identical with the aforementioned initial value. Therefore, it is found that the aforementioned processing has no problem.

The value of the remainder of B modulo n is B11. This B11 is output to the first and second add & mod circuits 110 and 150. The next processing is that the B11 is shifted (that is, "doubled") one bit to the MSB side and that the result is input to the adder 210. Then, the adder 210 receives n from the n-register 130, and adds the inverted value of each bit of n, 1, and the shifted B11. If a carry occurs, the subtraction will be successful, and the shifted.B11 will be stored in the register 200. If a carry does not occur, the shifted B11 is stored in the register 200. The value stored in the register 200 is B12. This B12 is output to the first and second add & mod circuits 110 and 150. In this shift operation, the register 200 may be operated as a shift register, and the adder 210 may receive the value of the register 200 shifted by one bit.

The aforementioned processing is repeated until B1m is generated. If the processing of B1m in the first add & mod circuit 110 ends, the result of the processing will be input to the register 200. The register 200 holds the result of the processing and outputs it to the second add & mod circuit 150. The result of the processing is B21. The first, add & mod circuit 110 has B21 and may not perform processing. Then, as previously described, B21 is shifted one bit to the MSB side, and in the adder 210, the result of the shift, 1, and the inverted value of each bit of n are added. If a carry occurs as a result of the addition, the result of the addition will be stored in the register 200. If a carry does not occur, the shift result will be stored in the register 200. This value is B22. The B22 is output to the first and second add & mod circuits.

The aforementioned processing is repeated until Bmm through B2m are generated. Next, the details of the first add & mod circuit 110 are shown in FIG. 3. The first add & mod circuit 110 is constituted by an accumulator 250 and a switching circuit 260. The accumulator 250 includes an adder 250a and a register in which a result of addition is stored. Since the first add & mod circuit 110 performs addition calculation and MOD calculation, in the adder 250a there are both inputs from the shift & mod circuit 100 and the n-register 130. The switching circuit 260 is connected to the adder 250a. The output of the accumulator 250 is connected to both the first register 120 and the shift & mod circuit 100.

The operation of the circuit will next be described. First, the circuit receives an initial input B11 from the shift & mod circuit 100. As previously described, the B11 excluding the LSB may be output to the first register 120, and the B11, as it is, may be output to the first register 120. When the value of the LSB of B11 is 1, the adder 250a adds B11 and the value (O for this example) of a register (not shown). When the value of the LSB of B11 is 0, the adder 250a is not operated. This switching is usually instructed by the switching circuit 260. However, when the B11 excluding the LSB is output to the first register 120, the value of this LSB is employed as the output of the switching circuit 260. In the case other than that, the switching circuit 260 switches the operation in accordance with a value which is input from the LSB 120a.

Also, in the case where 0 has been stored in the register within the accumulator 250, the switching circuit 260 can instruct so that the received value is stored in the register in the accumulator 250 without operating the adder 250a (the case where the value of the LSB of B11 or the value of the LSB 120a is 1), because the remainder modulo n has already been calculated in the shift & mod circuit 100.

If the value of the LSB of B11 or the value of the LSB 120a is 1, then the switching circuit 260 will instruct the adder 250a to employ the value of the n-register 130. The calculation of the remainder modulo n, as previously described, is the addition of a complement of 2 of n. The adder 250a adds the inverted value of each bit of n, 1, and the value held in the register of the accumulator 250. If a carry occurs as a result of the addition, the addition result will be stored in the register of the accumulator 250. In the case other than that, the value of the register of the accumulator 250 is held.

Furthermore, when B12 is input, the switching circuit 260 refers to the value of the LSB 120a and determines whether it holds the accumulator 250 or not. If the value of the LSB 120a is 1, the switching circuit 260 will instruct so that B12 is received. In the adder 250a, B12 is added to the value of the register of the accumulator 250. After addition, the switching circuit 260 instructs so that the output from the n-register 130 is received, in order to calculate the remainder modulo n. Thereafter, the operation is performed in the same way.

B1m is input, and the switching circuit 260 instructs whether addition and calculation of the remainder modulo n are executed or whether the held value is held. After processing has been performed according to the instruction, the value held in the register in the accumulator 250 is output to the first register 120 and the shift & mod circuit 100. At this time, as with the case when B11 is input, the B11 may be output to the first register 120, excluding the LSB, and the B11, as it is, may be output. In either case, $B^2$ (mod n) will be calculated if B1m is processed. If the value of the LSB of $B^2$ (mod n) is 1, the value held in the register of the accumulator 250 will be held without being cleared. On the other hand, when the LSB of $B^2$ (mod n) is 0, the value of the register of the accumulator 250 is cleared. At this stage, the processing with respect to B21 will end.

The aforementioned processing is repeated up to the processing of Bmm. The foregoing constitution is merely an example, and the input from the n register 130 needs to be processed before it is input to the adder 250a. Therefore, after the input has been processed by the switching circuit 260 or other circuits, it may be input.

Also, when the switching circuit 260 indicates the output of the LSB 120a is 0, the switching circuit 260 can also instruct the accumulator 250 not to input a clock or instruct the accumulator 250 to skip a clock. If done in this way, consumption power can be suppressed.

Also, if the MOD calculation is executed for each addition, the speed of the operation will become slow. Hence, the calculations of the remainder modulo n can be modified so that they are executed at a time. Since the accumulator 250 does not operate when the value of the LSB 120a is 0, this period is utilized for the aforementioned modification. First, the switching circuit 260 confirms that the value of the LSB 120a is 0 and furthermore inspects whether the value stored in the register of the accumulator 250 is a positive value. Then, when the both requirements are met, the switching circuit 260 instructs, for example, so that 4n is subtracted from the value stored in the register in the accumulator 250. The subtraction of this 4n is obtained by quadrupling (that is, shifting by two bits) a value taken out from the n-register 130, inverting each bit of this value, and adding the inverted value, 1, and a value of the register of the accumulator 250. 4 is an arbitrary number, and in general, n can be increased by integer times greater than I (or equal to 1). Since it is easy if a value is obtained by shifting n, the value may be increased by 2 times, 4 times, 8 times, 16 times, . . . However, if an excessively large value is subtracted, the number of bits of the register of the accumulator will be correspondingly increased. Also, if an excessively small value is subtracted, the processing must be performed many times and therefore consumption power will be increased. Therefore, a value to be subtracted needs to be determined in view of the number of bits of B. Also, the processing may be performed when the output of the LSB 120a is 1, however, since the processing is performed after addition, the processing time is a little increased as compared with the case where the processing is performed when the output of the LSB 120a is 0.

After 4n has been subtracted in the aforementioned way, next the value of the LSB 120a is 0, and an output from the shift & mod circuit 100 can be simply added until the value of the register in the accumulator 250 becomes a positive value (the case where the value of the LSB 120a is 1). Therefore, once 4n is subtracted, the switching circuit 260 does not instruct that an operation is switched to the process for calculating the remainder modulo n, until the aforementioned requirements are again met. Then, B1m, B2m, B3m . . . are input, and when the processing is performed by the accumulator 250 (the processing includes a process where no operation is performed), the switching circuit 260 confirms a value stored in the register of the accumulator 250. If the value stored in the register of the accumulator 250 is a negative value, the switching circuit 260 will instruct the adder 250a to add the n from the n-register 130 to the value of the register of the accumulator 250, until the value of the register of the accumulator 250 becomes positive. Also, if the value stored in the register in the accumulator 250 is positive, the switching circuit 260 will instruct so that 4n is subtracted from the value stored in the register of the accumulator 250. If the subtraction result is not negative, the subtraction will be performed until the subtraction result becomes negative. Then, after the subtraction result has become negative, the switching circuit 260, as with the aforementioned case, instructs the adder 250a to add yn (where y is a positive integer) until the addition result becomes positive.

The processing becomes slightly complicated. However, if done in the aforementioned way, the number of calculations for the remainder modulo n will be reduced, and consequently, the entire processing speed will be accelerated and consumption power will be reduced. In addition, since an irregular correcting operation is performed in the end of the processing, it becomes difficult to steal the key. However, the number of bits of the register of the accumulator 250 is slightly increased.

The first register 120 can also be improved from the standpoint of a reduction of the consumption power. In the foregoing description, the first register 120 is a shift register, and each time the output of the shift & mod circuit 100 is input to the first add & mod circuit 110, the first register 120 shifts the output. However, if the number of bits of the register which are shifted is increased, the consumption power will be increased. Therefore, for example, only 8 bits from the LSB are shifted one bit at a time and when the 8 bits are all shifted, the remaining bits are shifted 8 bits. Then, only 8 bats from the LSB are also shifted one bit at a time and when the 8 bits are all shifted, the remaining bits are further shifted 8 bits. If this processing is repeated, consumption power can be reduced. Note that the second register 160 and the C register 140 can also be constructed in the same way as the first register 120. Also, 8 bits are arbitrary, and in general, integer bits more than 2 can be shifted. However, if the number of bits that are shifted is small, the shifting effect will be diminished.

Next, the details of the second add & mod circuit 150 are shown in FIG. 4. The basic constitution is similar to the first add-modulo circuit 110, but the LSB of C from the C register 140 is input to a switching circuit 310. As previously described, this is because the second add & mod circuit 150 switches a process in accordance with the LSB of C from the C register 140. More specifically, if the LSB of C (including the LSB obtained by a shift operation) is 0, the input from the shift & mod circuit 100 to the second add & mod circuit 150 will not be processed m times. On the other hand, if the LSB of C is 1, the input from the shift & mod circuit 100 to the second add & mod circuit 150 will be processed m times. Thereafter, according to the value of the LSB 160a, it is judged whether addition and MOD calculation are actually executed.

In addition, the result of the processing of B1m, B2m, B3m, . . . is not fed back to the first shift & mod circuit 100 as the first add & mod circuit 110 does.

Furthermore, after the processing of B1m, B2m, B3m, . . . is performed and the result of the processing is output to the second register 160, the value of the register (not shown) within the accumulator 300 is always cleared. Moreover, there is no possibility that the initial value B11 is input to the second register 160. This is because the initial value has already been given to the second register 160. For the operations thereafter, there is no difference in the first and second add & mod circuits.

In this embodiment, the accumulator 300 is not operated completely by the value of the LSB of the C register 140. In such a case, the switching circuit 310 can stop a clock which is input to the accumulator 300 so that excess power is not consumed.

There are some variations for shift & mod circuit 100. In the example described above, in the normal cycle, n is subtracted (−n is added) after one-bit shift, and if the subtracted value is positive, the subtracted value is stored. But, if the subtracted value is negative, a value after a one-bit shift is stored. The simple pseudo code of this processing is represented as follows:

if (2DB−n≧0)
    DB=2DB−n
else
    DB=2DB

DB is a value in the register 200. Because n is odd in RSA system, DB=0 does not happen. Therefore, the actual range of DB is 0<DB<n.

On the other side, in this variation, positive and negative values are allowed for DB, then −n; K DB<n. That is, shift & mod circuit 100 performs the calculation represented by the following pseudo code.

if (DB≧0)
    DB=2DB−n
else
    DB=2DB+n

Because n is odd, actually −n<DB<n is satisfied.

If done in this way, there is no need to perform the control that includes the step of checking the result of 2DB−n and storing 2DB−n or 2DB as described in the above embodiment. In addition, it is possible to determine whether addition or subtraction is performed in advance, based on DB being positive or negative. Therefore, the processing is speeded up. Furthermore, because in the embodiment described above, the first and second add & mod circuits add only positive values (DB), there is a need to subtract n at each addition or 4n at an appropriate time. But in this variation, DB varies between positive values and negative values. DB becomes an approximately desired value after the end of the processing without the adjustment calculation. Therefore, the advantage of this variation are (1) the adjustment calculation is unnecessary and (2) reduction of the power consumption and (3) the processing of the first and second add & mod circuit is speeded up. In addition, when −4n is used, wiring for 2-bit shifting of n is necessary. But in this variation, this wiring is unnecessary and the configuration of the addition circuit becomes simple. Furthermore, because the parasitic capacity can be reduced by an appropriate circuit layout without this wiring, further speed-up is expected by this reduction.

In the above embodiment, shift & mod circuit 100 always calculates 2DB (mod n). But the first add & mod circuit 110 adds 2DB (mod n) when the value of LSB 120*a* in the first register 120 is 1. The second add & mod circuit 150 adds 2DB (mod n) when the LSB in the C register 140 is 1 and the value of LSB 160*a* in the second register 160 is 1. Therefore, there exists a case where both of the first and second add & mod circuits do not perform addition. In such a case, there is no need to calculate 2DB (mod n), then by skipping this calculation and calculating 4DB (mod n), the number of the necessary clocks for the whole calculation can be reduced. The condition shift & mod 100 can calculate 4DB (mod n) is as follows:

(1) The LSB of the C register 140 is 0 and LSB 120*a* in the first register is 0.
(2) The LSB of the C register 140 is 1 and LSB 120*a* in the first register is 0 and LSB 160*a* in the second register is 0.

The probability such cases happen is about 30% and the processing is speeded up about 30%.

Then, the processing of shift & mod circuit 100 when 4DB (mod n) is calculated is described. Note the range of DB is −n<DB<n. Because DB is a binary number with sign, if the sign at the first bit is 0, the binary number is positive or zero, if the sign at the first bit is 1, the binary number is negative. Because n is positive, n has no sign bit. The shift & mod circuit 100 performs the following, calculation shown in the below table.

TABLE 1

| (a) DB > 0 | | | | | | |
|---|---|---|---|---|---|---|
| DB | 0000 | 0001 | 0010 | 0011 | 0011 | 01xx |
| n cal- cul- ation | 1x 4DB | 1x 4DB − n | 1x 4DB − 2n | 11 4DB − 2n | 10 4DB − 3n | 1x 4DB − 3n |

| (b) DB < 0 | | | | | | |
|---|---|---|---|---|---|---|
| DB | 1111 | 1110 | 1101 | 1100 | 1100 | 10xx |
| n cal- cul- ation | 1x 4DB | 1x 4DB − n | 1x 4DB − 2n | 11 4DB − 2n | 10 4DB − 3n | 1x 4DB − 3n |

(a) indicates a case where DB is positive or zero.
(b) indicates a case where DB is negative. The first row in the table 1 represented as DB indicates cases based on values of the first four bits of the DB with sign. The second row represented as n indicates cases based on values of the first two bits of n (substantially, cases based on values of the second bit of n), x in the table 1 means 0 or 1.

With this processing, DB is within −n<DB<n and periods for which the first and second add & mod circuits do not operate can be neglected. In the first embodiment, the bit number of B, C and n is, for example, 1024 and the registers also has the number of bits corresponding to 1024. But since input data is filled from LSB of a register if the bit number of the input data is smaller than the bit number of the register, the type of calculation cannot be determined by first some bits from MSB like in table 1. Therefore, in such a case, data can be filled from MSB side, then if there are some unfilled bits on LSB side, 0 can be filled in the bits. Assuming the number of filled 0 is q, this means calculation based on a value multiplied by 2 modulo 2n. Therefore, by dividing by 2 in the last step, the result is the same. For example, 8 (mod 3)=2, and 800 (mod 300)=200, then by dividing 200 by 100, 2 is derived. It represents this logic is correct.

When DB is filled from LSB side, bits on MSB side where 0 is filled repeats turning over from/to "000 . . . " to/from "111 . . . " because the sign of DB turns over between positive and negative. If DB is filled from MSB side, bits on LSB side where 0 is filled never change from ". . . 000" to achieve the reduction of the power consumption. In addition, referring to the first four bits of DB and the second bit of n, that is, 5 bits, the content of the calculation can be determined.

In some cases, it is possible to calculate 8DB (3-bit shift) and 16DB (4-bit shift) on behalf of 4DB. But as 3n is needed in the case of 2DB (2-bit shift), when 8DB and 16DB are performed, 5n, 6n, 7n, 8n, 9n, 10n, . . . also are necessary. Therefore, this calculation is not practical.

Further, it is possible to change the calculation method in the table 1. In the table 1, 3n is needed, then this change makes 3n unnecessary. That is, shift & mod circuit 100 performs processing as shown in following pseudo code:

```
if (DB ≧ 0)
    if (2DB - n = "000xxx" or "111xxx")
        DB = 2 (2DB - n)
    else
        DB = 2DB - n
else
    if (2DB + n = "000xxx" or "111xxx")
        DB = 2 (2DB + n)
    else
        DB = 2DB + n
```

"000XXX" and "111xxx" means the upper three bits of the calculation result is checked. This check is performed to determined whether a value finally stored in register 200 is in [−n, n) or not. If the value is in this range, 2DB−n or 2DB+n can be further doubled. If not, 2D−n or 2DB+n can not be doubled, then 2DB−n or 2DB+n is stored. This processing achieves about 10% speed-up.

Note that the adder used in the present invention can be operated at high speed and handles a long bit length. For example, if 1024 full adders are connected, only the gate array will take about 1 μsec and the operating speed will be limited to 1 MHz. When two values to be added are divided like 1, 2, 3, 4, . . . , 44, and 45, addition is performed in each group of the divided bits and then the result of the addition is corrected to a right value by a 1-incrementer. Also, circuit size is about twice that of a circuit where full adders are arranged. If total bits are 1024, the operating speed can be about 20 times faster than that of the circuit. The total number of bits is the total of 1 . . . N. Therefore, if division has been performed so as to satisfy N (0.5 N (N+1)>1024), adders can be assembled with a delay of N gates. That is, in the case of 512 bits, there is a 34-stage delay for the total circuit which include a 32-stage delay for adders and two-stage delay for a 1-incrementer. In the case of 1024 bits, there is a 45-stage delay, and in the case of 2048 bits, there is a 66-stage delay. Note that the technique is described, for example, in Information Processing, Vol. 37, No. 1, pp 80–85, and Information Processing Society of Japan Issue, January, 1996.

If done in the aforementioned way, a circuit can be constructed so that $B^c$ (mod n) is calculated simply and at high speed. However, the circuit must be constructed so that the secret key is not stolen. For this purpose, in the case where the chips mounted on the circuit are analyzed, the circuit should be constructed so as to be destroyed. Also, by employing Automatic Built-In Self Test (ABIST), testability is made high and the circuit is made difficult to read. In addition, by employing a dynamic latch, the circuit operation is made unstable when analyzed with a low frequency. Furthermore, if a secret key is scrambled by LSFR, it will become more effective. In this case, instead of C being stored in the C register, a circuit (LFSR) for generating C is needed.

The circuit explained above is used as a part of cryptographic system described in the Background Art. For example, it is possible to construct a system where an encryption apparatus 1100 and a decryption apparatus 1200 are connected through a network 1000 like in FIG. 7. Other encryption/decryption apparatuses can be connected to the network 1000. If RSA cryptographic system is employed, in the encryption apparatus 1100, a message M is encrypted into $C=M^e$ (mod n) by using a pubic key e for the decryption apparatus 1200. The circuit explained above is effective to this processing. Then, the encryption apparatus 1100 transmits C to the decryption apparatus 1200 through the network 1000. In the decryption apparatus 1200, $M=C^d$ (mod n) is calculated by using a secret key d for the decryption apparatus 1200. The circuit explained above also is effective to this calculation. But the cryptographic system is not limited to RSA. For example, ElGamal method and other public key systems using modular exponentiation functions can employ this circuit. In addition, processing for the electric signature may uses the calculation $B^c$ (mod n) In such a case, this circuit also is useful.

In accordance with present invention, as described above, there is provided an apparatus which calculates the remainder of $B^c$ modulo n at high speed with a minimum hardware resource, while securing the safety of the key.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. An apparatus for calculating $B^c$ (mod n), comprising:
   a first circuit for executing a process of calculating B (mod n) and holding the calculation result B1 and for repeating a process of shifting a holding value and calculating a value congruent to the shifted holding value modulo n and holding the calculation result;
   a first register for storing said B1 as an initial value;
   a second circuit for cumulating the calculation result of said first circuit when a value of a bit at a predetermined position of said first register is equal to 1;
   a second register for storing 1 as an initial value;
   a C output circuit for outputting C;
   a third circuit for cumulating the calculation result of said first circuit when an output value from said C output circuit is equal to 1 and a value of a bit at a predetermined position of said second register is equal to 1;
   wherein the bit at the predetermined position of the first register and the second register shifts from LSB to MSB of their stored values; and
   wherein, when a process for MSB of a value stored by the first register ends,
   (a) a value congruent to the cumulated result in the second circuit modulo n is set as said holding value and stored into the first register,
   (b) the output of the C output circuit changes to a value shifted from LSB to MSB of the C, and
   (c) when the output of the C output circuit is 1, a value congruent to the cumulated result in the third circuit modulo n is stored in the second register.

2. The means of claim 1, wherein said first register is a shift register.

3. The means of claim 1, wherein in said second register is a shift register.

4. The means of claim 1, wherein said C output circuit is a shift register.

5. The means of claim 1, wherein said second circuit includes a circuit for calculating a remainder of the cumulated value modulo n, each time the calculation result of said first circuit is cumulated.

6. The means of claim 1, wherein said third circuit includes a circuit for calculating a remainder of the cumulated value modulo n, each time the calculation result of said first circuit is cumulated.

7. The means of claim 1, wherein said second circuit includes a circuit for subtracting xn, where x is a positive integer, from said cumulated value in the second circuit when the value of the bit at the predetermined position of said first register is 0 and the cumulated value in said second circuit is a positive value.

8. The means of claim 7, wherein said second circuit judges whether the cumulated value in said second circuit is a positive value or not when said process for MSB of a value stored by said first register ends; and subtracts xn from said cumulated value in said second circuit until said cumulated value becomes negative, when it is judged that said cumulated value is positive; and adds yn, where y is a positive integer, to the cumulated value in said second circuit until said cumulated value becomes positive, when it is judged that said cumulated value is negative.

9. The means of claim 1, wherein said third circuit subtracts xn, where x is a positive integer, from cumulated value in the third circuit when the output value of said C output circuit is 1 and the value of the bit at the predetermined position of said second register is 0 and the cumulated value in said third circuit is a positive value.

10. The means of claim 9, wherein said third circuit judges whether the cumulated value in said third circuit is a positive value or not, when the output of the C output circuit is 1 and a process for MSB of a value stored by the second register ends; and subtracts xn from said cumulated value in the third circuit until said cumulated value becomes negative, when it is judged that said cumulated value is positive; and adds n to said cumulated value in the third circuit until said cumulated value becomes positive, when it is judged that said cumulated value is negative.

11. The means of claim 1, further comprising an n-register for storing n; and wherein, during said process of calculating B (mod n) and holding the calculation result B1: said n-register shifts said n in a direction of a most significant bit so that a first bit, which is 1, becomes the most significant bit when said n is checked from the most significant bit and then shifts the shifted value one bit at a time in a direction of the least significant bit until it becomes equal to said B, and outputs each shifted value after the change of the shift direction in sequence to said first circuit; and said first circuit makes a subtraction if each shifted value obtained from said n-register can be subtracted from said B.

12. The means of claim 1, wherein said first circuit shifts the holding value and subtracts pn, where p is a positive integer, from the shifted holding value when the holding value is positive; and shifts the holding value and adds qn, where q is a positive integer to the shifted holding value when the holding value is negative.

13. The means of claim 1, wherein said first circuit shifts the holding value by r bits, where r is a positive integer, and calculates a value congruent to the shifted holding value modulo n when the values at the predetermined position of the first and second register and the output value of the C output circuit are values such that the second and third circuit do not perform the cumulation.

14. The means of claim 13, wherein said r is 2; and said first circuit multiplies the holding value by 4 and subtracts one value selected from a group of n and 2n and 3n based on the holding value and n from the multiplied holding value when the holding value is positive; and multiplies the holding value by 4 and adds one value selected from a group of n and 2n and 3n based on the holding value and n to the multiplied holding value when the holding value is negative.

15. The means of claim 13, wherein said r is 1; and said first circuit doubles the holding value and subtracts, n from the doubled holding value when the holding value is positive, and determines based on the shifted and doubled holding value whether the shifted and doubled holding value is further doubled; and doubles the holding value and adds n to the doubled holding value when the holding value is negative, and determines based on the shifted and doubled holding value whether the shifted and doubled holding value is further doubled.

16. A cryptographic apparatus comprising:

a circuit for calculating $B^c$ (mod n), including:

a first circuit for executing a process of calculating B (mod n) and holding the calculation result B1 and for repeating a process of shifting a holding value and calculating a value congruent to the shifted holding value modulo n and holding the calculation result;

a first register for storing said B1 as an initial value;

a second circuit for cumulating the calculation result of said first circuit when a value of a bit at a redetermined position of said first register is equal to 1;

a second register for storing 1 as an initial value;

a C output circuit for outputting C;

a third circuit for cumulating the calculation result of said first circuit when an output value from said C output circuit is equal to 1 and a value of a bit at a predetermined position of said second register is equal to 1;

wherein the bit at the predetermined position of the first register and the second register shifts from LSB to MSB of their stored values; and wherein, when a process for MSB of a value stored by the first register ends, (a) a value congruent to the cumulated result in the second circuit modulo n is set as said holding value and stored into the first register, (b) the output of the C output circuit changes to a value shifted from LSB to MSB of the C, and (c) when the output of the C output circuit is 1, a value congruent to the cumulated result in the third circuit modulo n is stored in the second register.

17. A network system including an encryption apparatus and a decryption apparatus, at least one of said encryption apparatus and said decryption apparatus comprising:

a circuit for calculating $B^c$ (mod n), including:

a first circuit for executing a process of calculating B (mod n) and holding the calculation result B1 and for repeating a process of shifting a holding value and calculating a value congruent to the shifted holding value modulo n and holding the calculation result;

a first register for storing said B1 as an initial value;

a second circuit for cumulating the calculation result of said first circuit when a value of a bit at a predetermined position of said first register is equal to 1;

a second register for storing 1 as an initial value;

a C output circuit for outputting C;

a third circuit for cumulating the calculation result of said first circuit when an output value from said C output circuit is equal to 1 and a value of a bit at a predetermined position of said second register is equal to 1;

wherein the bit at the predetermined position of the first register and the second register shifts from LSB to MSB of their stored values; and wherein, when a process for MSB of a value stored by the first register ends, (a) a value congruent to the cumulated result in the second circuit modulo n is set as said holding value and stored into the first register,
(b) the output of the C output circuit changes to a value shifted from LSB to MSB of the C, and
(c) when the output of the C output circuit is 1, a value congruent to the cumulated result in the third circuit modulo n is stored in the second register.

* * * * *